(12) United States Patent
Zhang et al.

(10) Patent No.: US 11,596,104 B2
(45) Date of Patent: Mar. 7, 2023

(54) FRUIT AND VEGETABLE PICKING METHOD AND DEVICE BASED ON MACHINE VISION AND STORAGE MEDIUM

(71) Applicant: SHENZHEN UNIVERSITY, Shenzhen (CN)

(72) Inventors: Tan Zhang, Shenzhen (CN); Hui Huang, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 245 days.

(21) Appl. No.: 16/763,727

(22) PCT Filed: Feb. 28, 2019

(86) PCT No.: PCT/CN2019/076542
§ 371 (c)(1),
(2) Date: May 13, 2020

(87) PCT Pub. No.: WO2020/155277
PCT Pub. Date: Aug. 6, 2020

(65) Prior Publication Data
US 2021/0212257 A1 Jul. 15, 2021

(30) Foreign Application Priority Data
Jan. 30, 2019 (CN) .................. 201910091794.X (51) Int. Cl.
*A01D 46/30* (2006.01)
*A01D 45/00* (2018.01)

(52) U.S. Cl.
CPC .............. *A01D 46/30* (2013.01); *A01D 45/00* (2013.01)

(58) Field of Classification Search
CPC ...... A01D 46/30; A01D 46/24; A01D 46/253; A01D 45/00
See application file for complete search history.

(56) References Cited

U.S. PATENT DOCUMENTS

| 5,442,552 A | * | 8/1995 | Slaughter | ............. G05D 1/0246 701/28 |
| 9,913,429 B1 | * | 3/2018 | Stubbs | ................. G06V 10/225 |

(Continued)

FOREIGN PATENT DOCUMENTS

| CN | 106209646 A | 12/2016 |
| CN | 107862254 A | 3/2018 |

(Continued)

OTHER PUBLICATIONS

International Search Report dated Nov. 6, 2019 in corresponding International application No. PCT/CN2019/076542; 10 pages including Machine-generated English-language translation.

*Primary Examiner* — Alicia Torres
*Assistant Examiner* — Madeline I Runco
(74) *Attorney, Agent, or Firm* — Maier & Maier, PLLC (57) ABSTRACT

A fruit and vegetable picking method and device based on machine vision and storage medium that includes: acquiring fruit image of fruit or vegetable to be picked currently, calling pre-trained neural network model to identify fruit image, and determining type of fruit or vegetable; acquiring type of fruit or vegetable, and determining cuttable area on stalk of fruit or vegetable according to type of fruit or vegetable, locating cutting point; controlling end picking apparatus to cut off stalk of fruit or vegetable, according to cutting point being determined. By using pre-trained neural network model to detect fruit and cut stalk for picking, one device may be able to pick multiple fruits and vegetables, have high versatility and picking accuracy, avoid hurting pulp, and have improved harvest efficiency and quality of fruits and vegetables picked.

9 Claims, 3 Drawing Sheets

(56) References Cited

U.S. PATENT DOCUMENTS

| | | | |
|---|---|---|---|
| 10,219,449 B2* | 3/2019 | Redden | A01M 21/046 |
| 10,757,861 B2* | 9/2020 | Robertson | G06K 9/6282 |
| 10,779,472 B2* | 9/2020 | Robertson | G05D 1/0094 |
| 2016/0050852 A1* | 2/2016 | Lee | H04N 7/18 |
| | | | 901/41 |
| 2017/0034986 A1* | 2/2017 | Koch | A01D 41/127 |
| 2018/0220589 A1* | 8/2018 | Burden | G06V 20/188 |
| 2018/0330166 A1* | 11/2018 | Redden | G06T 7/0002 |
| 2019/0166765 A1* | 6/2019 | Maor | G06V 20/188 |
| 2019/0380278 A1* | 12/2019 | Burden | B25J 19/0054 |
| 2020/0333782 A1* | 10/2020 | Kent | G05D 1/0278 |
| 2020/0375094 A1* | 12/2020 | Calleija | A01D 34/03 |
| 2021/0337734 A1* | 11/2021 | Jeanty | B65G 47/90 |
| 2022/0007582 A1* | 1/2022 | Lapalme | A01D 46/30 |

FOREIGN PATENT DOCUMENTS

| | | |
|---|---|---|
| CN | 108575318 A | 9/2018 |
| CN | 109197160 A | 1/2019 |
| CN | 109220226 A | 1/2019 |
| KR | 2017-0011503 A | 2/2017 |
| WO | 2018/087546 A1 | 5/2018 |

* cited by examiner

FRUIT AND VEGETABLE PICKING METHOD AND DEVICE BASED ON MACHINE VISION AND STORAGE MEDIUM

CROSS-REFERENCES TO RELATED APPLICATIONS

This application is a national stage application of PCT Patent Application No. PCT/CN2019/076542, filed on 28 Feb. 2019, which claims priority to Chinese Patent Application No. 201910091794X, filed on 30 Jan. 2019, the content of all of which is incorporated herein by reference.

FIELD

The present disclosure relates to the field of fruit and vegetable picking technology, and, more particularly, to a fruit and vegetable picking method and a device based on machine vision and a storage medium.

BACKGROUND

In recent years, developing an intelligent robot is a research hotspot. Through an application of the intelligent robots, it is able to effectively improve an operating efficiency and reduce a labor intensity and a production cost in an industrial and agricultural production. In terms of an agricultural robot, a fruit and vegetable picking robot is one main means of developing a modern agricultural production, while a visual recognition and picking method of a picking robot is one key technology that is able to successfully complete a picking operation. However, comparing to a current development of the agricultural production at home and abroad, a research achievement of the picking robot is rather few. A recognition system of most picking robots can only identify a single type of fruit or vegetable, thus can only be applied to pick a single type of fruit or vegetable, while each type of the fruits requires a different robot arm and a different end picking apparatus, which has greatly increased a processing cost of the picking robot. At a same time, most robots achieve picking through grabbing a pulp. However, for different types of fruits or vegetables, or even a same type of the fruit or vegetable in a different shape or at a different position, a grabbing point and a grabbing moment is different, while a fruit and vegetable picking robot in the prior art is not able to determine a specific grabbing point according to a plurality of factors including a type, a shape, and a position of the fruit or the vegetable, which affects a picking accuracy.

Therefore, the current technology still needs to be improved and developed.

SUMMARY

According to the above described defects, the purpose of the present disclosure is providing a fruit and vegetable picking method and a device based on machine vision, as well as a storage medium, in order to solve a problem that a fruit and vegetable picking robot in the prior art is unable to detect a plurality of types of fruit and vegetable, and unable to decide a position of the grabbing point according to different fruits and vegetables.

In order to achieve the above-mentioned goals, the technical solutions of the present disclosure to solve the technical problems are as follows:

A fruit and vegetable picking method based on machine vision, wherein comprising:

acquiring a fruit image of a fruit or a vegetable currently to be picked, calling a pre-trained neural network model to identify the fruit image, and determining a type of the fruit or the vegetable to be picked;

acquiring the type of the fruit or the vegetable to be picked, and determining a cuttable area on a fruit stalk of the fruit or the vegetable to be picked according to the type of the fruit or the vegetable, before locating a cutting point;

controlling an end picking apparatus to cut off the fruit stalk of the fruit or the vegetable to be picked, according to the cutting point being determined.

The fruit and vegetable picking method based on machine vision, wherein before the step of acquiring a fruit image of a fruit or a vegetable to be picked currently, calling a pre-trained neural network model to identify the fruit image, and determining a type of the fruit or the vegetable to be picked, further comprising:

collecting a data set of different types of fruits and vegetables, and building a Mask r-cnn network model by using a deep learning framework including Tensorflow™ and Keras™;

performing a model learning and training on the data set by using a supervised learning method, and performing a feature extraction on the data set of different types of fruits and vegetables by using the model trained, and constructing a neural network model for automatically identifying the pulp of a fruit or a vegetable.

The fruit and vegetable picking method based on machine vision, wherein the data set comprises a plurality of fruit images of different types of fruits and vegetables.

The fruit and vegetable picking method based on machine vision, wherein the step of acquiring a fruit image of a fruit or a vegetable to be picked currently, calling a pre-trained neural network model to identify the fruit image, and determining a type of the fruit or the vegetable to be picked, comprising:

using a camera apparatus preset on the picking device to obtain a plurality of fruit images of the fruit or the vegetable to be picked, and preprocessing the fruit images;

extracting a plurality of features from the fruit images preprocessed, and calling the neural network model to identify the features extracted;

determining the type of the fruit or the vegetable to be picked, according to a recognition result.

The fruit and vegetable picking method based on machine vision, wherein the step of preprocessing the fruit images comprises: performing a noise reduction, a light supplement, and a white balance processing on the fruit images, to improve a quality of the fruit images.

The fruit and vegetable picking method based on machine vision, wherein the step of extracting a plurality of features from the fruit images preprocessed, and calling the neural network model to identify the features extracted, comprising:

calling a Mask r-cnn backbone network to extract a feature map of the fruit images preprocessed, and using a regional recommendation network to generate a region proposal for a target;

selecting a region of interest in the region proposal, before detecting the region of interest and outputting a recognition result.

The fruit and vegetable picking method based on machine vision, wherein the step of acquiring the type of the fruit or the vegetable to be picked, and determining a cuttable area on a fruit stalk of the fruit or the vegetable to be picked according to the type of the fruit or the vegetable, before locating a cutting point, comprising:

acquiring the detected type of the fruit or the vegetable to be picked, predicting and selecting the stalks in the fruit images according to the type of the fruit or the vegetable to select a plurality of stalk areas;

according to the stalk areas selected, a cuttable area on the stalk is determined, and a best cutting point is located.

The fruit and vegetable picking method based on machine vision, wherein the step of controlling an end picking apparatus to cut off the fruit stalk of the fruit or the vegetable to be picked, according to the cutting point selected, comprising:

controlling the end picking apparatus to clamp the stalk of the fruit or the vegetable to be picked, according to the cutting point selected;

cutting the stalk off after clamping the stalk, and controlling the end picking apparatus to restore an initial state after the stalk is cut.

A picking device, wherein comprising: a processor and a storage medium communicating with the processor, the storage medium is able to store a plurality of instructions; the processor is able to follow the instructions stored in the storage medium, to implement the steps of any of the fruit and vegetable picking method based on machine vision described above.

A storage medium, having a plurality of instructions stored, wherein the instructions are able to be loaded and executed by a processor, to implement the steps of any of the fruit and vegetable picking method based on machine vision described above.

Benefits: The present disclosure uses a pre-trained neural network model to detect a fruit and cut a fruit stalk thereof for picking, which may not only make it possible that using one device to pick multiple types of fruits and vegetables, but also picking fruits according to a type of the fruit and an actual situation thereof, having a high versatility and a high picking accuracy, without hurting the pulp, improving the harvest efficiency with a high quality of the fruits and vegetables.

DETAILED DESCRIPTION OF EMBODIMENTS

In order to make the purpose, technical solution and the advantages of the present disclosure clearer and more explicit, further detailed descriptions of the present disclosure are stated here, referencing to the attached drawings and some preferred embodiments of the present disclosure. It should be understood that the detailed embodiments of the disclosure described here are used to explain the present disclosure only, instead of limiting the present disclosure.

The present disclosure provides a fruit and vegetable picking method based on machine vision, which is able to be applied into a terminal, wherein the terminal includes, but is not limited to, a plurality of various personal computers, notebook computers, cell phones, tablet computers, in-vehicle computers, and wearable portable devices. A terminal of the present disclosure uses a multi-core processor, wherein the processor of the terminal may be at least one of a Central Processing Unit (CPU), a Graphics Processing Unit (GPU), and a Video Processing Unit (VPU).

Figure 1:
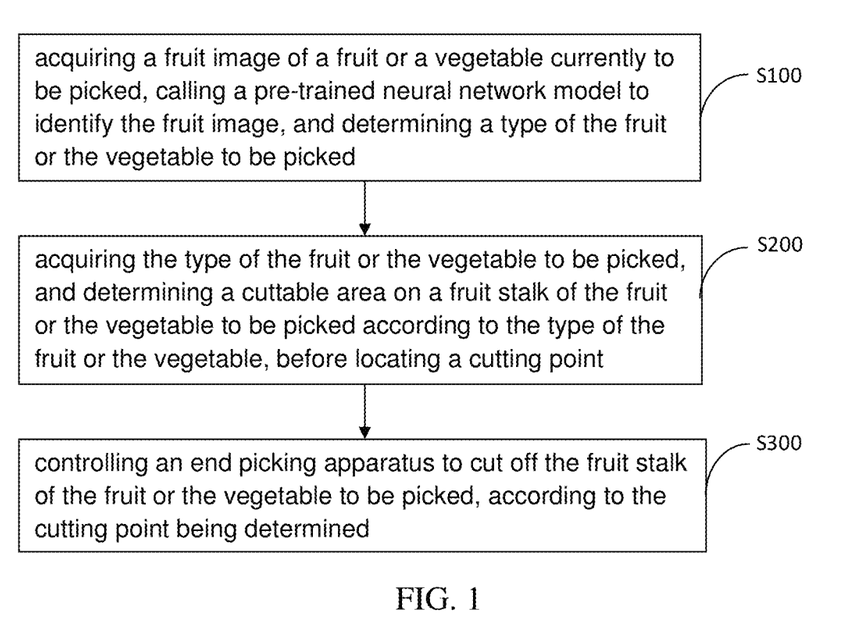
FIG. 1 illustrates a flowchart of an embodiment on the fruit and vegetable picking method based on machine vision.

The present disclosure provides a fruit and vegetable picking method based on machine vision, as shown in FIG. 1, the method comprises:

step S100: acquiring a fruit image of a fruit or a vegetable to be picked currently, calling a pre-trained neural network model to identify the fruit image, and determining a type of the fruit or the vegetable to be picked;

step S200: acquiring the type of the fruit or the vegetable to be picked, and determining a cuttable area on a fruit stalk of the fruit or the vegetable to be picked according to the type of the fruit or the vegetable, before locating a cutting point;

step S300: controlling an end picking apparatus to cut off the fruit stalk of the fruit or the vegetable to be picked, according to the cutting point being determined.

In a specific implementation, before the step S100, the present disclosure preliminarily constructs a neural network model capable of identifying the fruit image and judging the type of the fruit or the vegetable to be picked.

Further, to construct the neural network model, it is necessary to collect a data set of different types of fruits and vegetables in advance, and build a Mask r-cnn network model by using a deep learning framework including Tensorflow™ (which is a second-generation artificial intelligence (AI) learning system developed by Google based on DistBelief, named after an operation principle thereof, wherein Tensor means an N-dimensional array, Flow means a calculation based on a data flow graph, TensorFlow™ is a calculation process that a tensor flows from one end of the flow graph to another end of the flow graph. TensorFlow™ is a system of transferring a complex data structure into an AI neural network for analysis and process) and Keras™ (which is a high-level neural network API, written in pure Python and based on a plurality of back-ends including the Tensorflow™, Theano and CNTK), before performing a model learning and training on the data set by using a supervised learning method, and performing a feature extraction on the data sets of different types of fruits and vegetables by using the Mask r-cnn network model trained, and constructing a neural network model for automatically identifying the pulp of a fruit or a vegetable. The Mask r-cnn in the present embodiment is a small and flexible general object instance segmentation framework, which may not only detect a plurality of targets in an image, but also give a high-quality segmentation result for each target. The Mask r-cnn is extended on a basis of a Faster r-cnn, adding in parallel a new branch for predicting an object mask to a bounding box recognition branch. The network can also be easily extended to a plurality of other tasks, such as estimating a person's pose, that is, person keypoint detection. The framework has achieved a plurality of best results in a series of challenges in a COCO competition, including an instance segmentation, a bounding-box object detection, and a person keypoint detection.

Preferably, the data set comprises a plurality of pulp images of different types of fruits and vegetables. In order to improve an accuracy and a robustness of the neural network model that automatically detects the pulp of the fruits and vegetables, when the model is in learning and training, a data set contains as much information as possible shall be used to perform the training, that is, collecting data information as much as possible in advance, and making the data set contain various situations that may be encountered during a picking process. For example, the data set of different types of fruits and vegetables collected in advance may comprise the data of: a plurality of pulp images or plant images of different types of fruits and vegetables, a plurality of pulp images in different maturity levels of the fruits and vegetables, a growth environment of the fruit and vegetable, such as a plurality of environment images of a garden or a vegetable greenhouse, and a plurality of images of various fruits and vegetables in a to-be-picked state in the gardens or the vegetable greenhouses. Learning and training based on a variety and a big number of data, may bring the Mask r-cnn network model a wider recognition range and a more accurate recognition.

In the step S100 of the fruit and vegetable picking method based on machine vision in the present disclosure, a plurality of fruit images of the fruits and vegetables are first obtained, for example, taking photo or video to obtain fruit images of the fruits and vegetables through a camera. Then, calling a pre-trained neural network model and identifying the fruit images, to determine a type of the fruit and vegetable to be picked.

Further, in order to detect the fruit images more accurately and shorten a recognition time thereof, a further preprocessing on the fruit images obtained is performed, comprising a plurality of processes to the fruit images, including a noise reduction, a light supplement, a white balance processing and more, so as to improve a quality of the fruit images, thus making a plurality of subsequent recognition programs more efficient.

Figure 2:
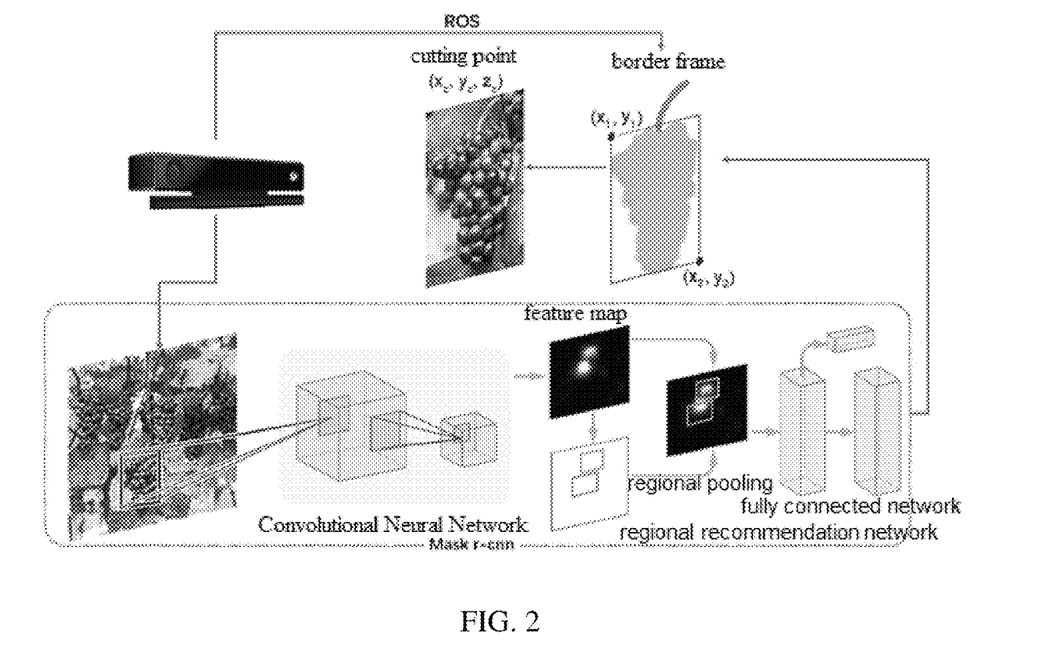
FIG. 2 illustrates a schematic diagram for identifying the pulp by using a neural network model of the fruit and vegetable picking method based on machine vision.

Further, as described above, the neural network model detects the fruit images of the fruits and vegetables to be picked by using the Mask r-cnn algorithm. The Mask r-cnn is currently a highest level instance segmentation algorithm, while a process of finishing an identification by using the Mask r-cnn network model consists of two stages: first, a feature map of the image is extracted by a Mask r-cnn backbone network, before a region proposal for a target is generated by a regional recommendation network, and the region proposal is then filtered to obtain a plurality of Regions of Interest (ROIs); next, predicting a category, a position and a mask of a corresponding object for each ROI. Specifically to the present disclosure, shown as FIG. 2, after obtaining and pre-processing a plurality of images of the fruits to be picked, first a feature map of the images of the fruit or the vegetable obtained is extracted by the Mask r-cnn backbone network, a region proposal of pulp-areas for the target is then generated on the feature map by the regional recommendation network, and the region proposal is filtered to obtain a plurality of Regions of Interest (ROIs) (Specifically to the present disclosure, the ROIs are the pulp-areas), followed by making a plurality of predictions for each ROI, including: the category, the position and the mask of corresponding pulp, according to a result of learning and training, before finishing a recognition of the pulp, and deciding a type of the fruit or the vegetable to be picked.

It is noted that, since a plurality of multiple fruits and vegetables may be mixed and planted in a same garden or vegetable greenhouse at a same time, when one type of the fruit or the vegetable is being picked, other fruits and vegetables may not be mature thus need not be picked. Therefore, the present disclosure provides another embodiment for the fruits and vegetables picking method, wherein a type of the fruits and vegetables to be picked may be set before picking, and during a picking operation, an identified type of the fruits and vegetables to be picked is compared to a preset type, if it is not the type of the fruits and vegetables to be picked, no subsequent picking will be performed.

It is understandable that, in the fruits and vegetables picking method provided by the present disclosure, it is also possible to add a recognition for a maturity of the fruits and vegetables into a prior training and learning of the neural network, and set a threshold of the maturity of the fruits and vegetables during picking, for example, for an apple or other fruits turning into red when mature, it is possible to set a depth of redness or a red area percentage as a maturity judgment value and set a corresponding threshold, during a picking operation, the maturity judgment value of the fruit to be picked having been identified is then compared with the corresponding threshold. If the corresponding threshold is not reached, no subsequent picking will be performed.

In the step S200 of the fruit and vegetable picking method based on the machine vision in the present disclosure, based on the positions and the corresponding masks of the pulp areas (ROIs) predicted by the Mask r-cnn algorithm, as well as the type of the fruit or the vegetable to be picked identified by the neural network model, a prediction and a frame selection of a fruit stalk of the fruit or the vegetable to be picked is performed, to determine the cuttable area on the fruit stalk of the fruit or the vegetable to be picked, and locate the cutting point.

In an embodiment, the prediction and the frame selection of the fruit stalk is performed according to a geometric algorithm. Specifically, based on identifying the type of the fruit or the vegetable to be picked, it is possible to determine an approximate length of the corresponding fruit stalk, while the fruit stalks of fruits or vegetables are all in a direction of the pulp close to the plant, thus on a basis that the approximate length of the corresponding fruit stalk is determined, together with the position of the pulp area and the mask corresponding to the pulp area predicted by using the Mask r-cnn algorithm, a geometric algorithm may be used to frame select an area of the fruit stalk.

Of course, in other embodiments, it is also possible to predict and frame select the areas of the fruit stalks according to a plurality of other algorithms, including using the Mask r-cnn algorithm to identify a stalk area before performing a frame selection and more. After the stalk areas are frame selected, an optimal cutting point on the stalk is further determined. Preferably, in the present embodiment, a point with a distance of 5-8 mm from the pulp area may be selected on the stalk area determined, and the point is the optimal cutting point. Of course, a specific cutting point selection position may be set according to the type of the fruit or the vegetable, which is not limited in the present embodiment.

In the step S300 of the fruit and vegetable picking method based on the machine vision in the present disclosure, an end picking apparatus is controlled to cut the fruit stalk of the fruit or the vegetable to be picked, according to the cutting point being determined.

Preferably, the end picking apparatus in the present embodiment may be a robot, a manipulator, or a plurality of other devices with a cutting function.

It is known that, an industrial robot is an intelligent robot that is most widely used, and there are a plurality of industrial robots having been widely used and mass-produced. However, an existing industrial robot may not be directly used as a garden picking robot for picking. In order to overcome a shortcoming of a high cost of a customized picking robot, the end picking apparatus in an embodiment of the present disclosure, by adding a structure of a picking clip, can achieve easily a direct use of the existing industrial robot to pick.

Figure 3:
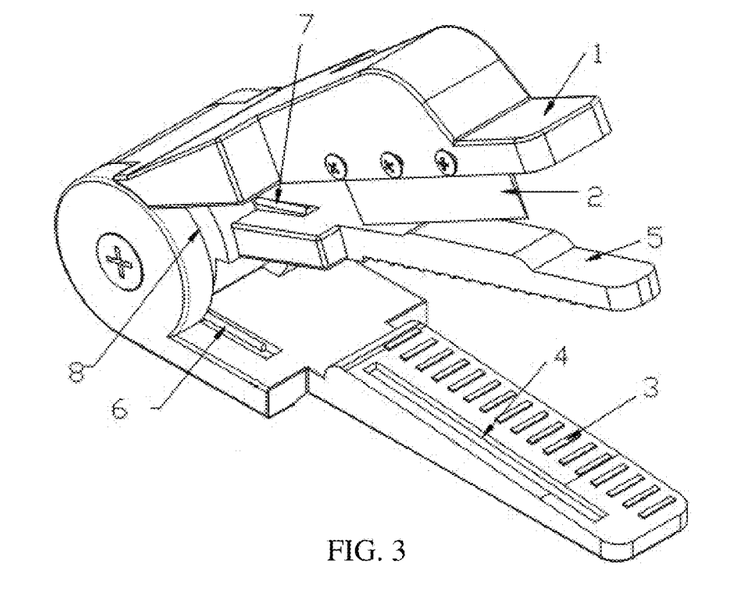
FIG. 3 illustrates a schematic diagram of a picking clip of an end picking apparatus according to an embodiment on the fruit and vegetable picking method based on machine vision.

Referencing to FIG. 3, which illustrates a schematic diagram of a picking clip of an end picking apparatus according to an embodiment on the fruit and vegetable picking method based on machine vision as provided by the present disclosure.

The picking clip comprises a pressing plate 1, a cutting blade 2, a supporting plate 3, a cutting groove 4, a clamping plate 5, a first elastic member 6, a second elastic member 7, and a connection assembly 8. Wherein the pressing plate 1, the clamping plate 5 and the supporting plate 3 are arranged in a sequence; the cutting blade 2 is disposed on a side of the pressing plate 1 facing to the supporting plate 3; the cutting groove 4 is disposed on the supporting plate 3, corresponding and cooperating with the cutting blade 2; the pressing plate 1, the clamping plate 5, and the supporting plate 3 are all connected to the connection assembly 8, and are all rotatable relative to the connection assembly 8; two free ends of the first elastic member 6 are connected to the pressing plate 1 and the supporting plate 3 respectively; two free ends of the second elastic member 7 are connected to the pressing plate 1 and the clamping plates 5 respectively; in a natural state, a distance between the two free ends of the first elastic member 6 is greater than a distance between the two free ends of the second elastic member 7, so that when the first elastic member 6 and the second elastic member 7 are both in the natural state, the pressing plate 1, the clamping plate 5, and the supporting plate 3 are separated from each other.

When holding both the pressing plate 1 and the supporting plate 3 respectively and bringing closer to each other, the first elastic member 6 is compressed, since a distance between the clamping plate 5 and the supporting plate 3 is less than a distance between the pressing plate 1 and the supporting plate 3, the pressing plate 1 drives the second elastic member 7 to move towards the supporting plate 3, while the clamping plate 5 moves towards the supporting plate 3, and contacts first with the supporting plate 3. Pressing the pressing plate 1 continuously, both the first elastic member 6 and the second elastic member 7 are compressed, and the cutting blade 2 is able to be inserted into the cutting groove 4.

When using the picking clip to pick the fruits or the vegetables having stalks, since in a natural state, the supporting plate 3 and the clamping plate 5 are separated from each other, thus, it is possible to first insert the stalk between the supporting plate 3 and the clamping plate 5, then press the supporting plate 3 and the pressing plate 1 towards each other, the clamping plate 5 will first move closer to the supporting plate 3 and clamp the stalk, continue pressing the pressing plate 1 and the supporting plate 3, the cutting blade 2 will contact and press the stalk into the cutting groove 4, thereby cutting the stalk off.

It can be seen that, the picking clip may cut the stalk off only by moving the supporting plate 3 and the pressing plate 1 closer to each other. Therefore, in the present embodiment, when fixing the picking clip directly onto a mechanical arm of an existing industrial robot, it is possible to move both the supporting plate 3 and the pressing plate 1 of the picking clip closer to each other by the mechanical arm, before completing an action of cutting the stalk.

Preferably, in the present embodiment, it is possible to use a robot having two fingers among all the existing industrial robots, as the end picking apparatus, and in such a way, the picking clip can be placed between the two fingers, while the supporting plate 3 or the pressing plate 1 is fixed onto one finger of the robot, when performing a cutting action, one finger approaches to another finger or both fingers approach to each other at a same time, driving the supporting plate 3 and the pressing plate 1 of the picking clip to move closer to each other, and after clamping the stalk of the fruit or the vegetable, they continue moving closer until cutting the stalk off.

Further, after the stalk is cut off, the picking clip in the present embodiment is still in a state of holding the stalk, that is, the fruit or the vegetable with the stalk being cut off is still being clamped on the end picking apparatus. Followed by controlling the end picking apparatus move to a position of a fruit or vegetable collection basket, the supporting plate 3 and the pressing plate 1 of the picking clip are controlled release and restore to the natural state, and the fruit or the vegetable is no longer clamped, and falling into the fruit or vegetable collection basket, that finishes picking the fruit or the vegetable. Preferably, after the picking clip returns to the natural state, the end picking apparatus also returns to an initial state, waiting for executing a next picking action.

It can be seen that, controlling the end picking apparatus to complete the picking process, requires an arm of the robot to move accurately to a position of the cutting point, before being able to complete the picking. While in the step S200, after predicting and frame selecting the fruit stalk area, a cutting point is framed out near a border of a frame, when the cutting point obtained is located based on an acquired image of the fruits or the vegetables to be picked, which is a two-dimensional coordinate on the image, it is needed to convert the two-dimensional coordinate into a three-dimensional spatial coordinate based on the cutting action of the end picking apparatus.

Specifically, in an embodiment, since the two-dimensional coordinate is determined based on the images of the fruit or the vegetable to be picked taken by a camera, thus the two-dimensional coordinate may be first converted into a three-dimensional spatial coordinate of a corresponding camera by Point Cloud2, before obtaining the three-dimensional coordinates based on the arm of the robot, through a coordinate transformation matrix of the camera and a base of the end picking apparatus, that is, the arm of the robot. The three-dimensional coordinate is applied for a plurality of subsequent operations of the end picking apparatus.

Figure 4:
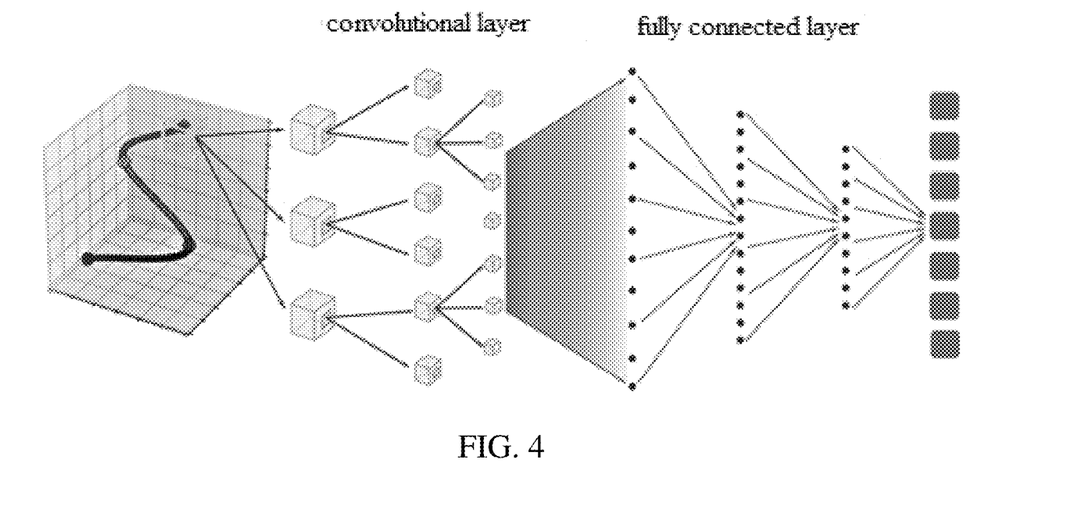
FIG. 4 illustrates a schematic diagram of a control network of an end picking apparatus according to an embodiment of the fruit and vegetable picking method based on machine vision.

In a real environment, an environment in a garden or a vegetable greenhouse is complex, while a noise of the robot itself or surrounding environment may bring a certain error when controlling the robot. In an embodiment, it uses an iterative training and fitting for a convolutional neural network to achieve an ability of calculating accurately a path of a robot operating terminal (the arm) moving to a cutting point. Shown as FIG. 4, in the present embodiment, the convolutional neural network comprises three convolutional layers and three fully connected layers, a mapping from the three-dimensional coordinate to an N degree of freedom of the arm of the robot is established. By a trained convolutional neural network, it is possible to convert the three-dimensional coordinate into a plurality of rotation angles of N degree of freedom of the arm of the robot, making the arm of the robot accurately reach the cutting point. An algorithm of the convolutional neural network may realize a precise control to the robot without knowing a plurality of configuration parameters of the robot, thereby improving an accuracy of picking.

From the picking process described above, it can be seen that, the fruit and vegetable picking method based on machine vision provided by the present disclosure, is performing a picking by cutting the fruit stalk after identifying the fruit, and during a whole picking process, no pulp is touched, thus a softer fruit or vegetable may be picked without hurting the pulp, ensuring a quality of the fruits or the vegetables. At a same time, the picking method of the present disclosure is finished based on cutting the fruit stalks, thus the picking method of the present disclosure may pick most fruits or vegetables having the fruit stalks, achieving using one device to pick a variety of fruits or vegetables, having a high versatility, and solving a plurality of shortcomings in an existing picking technology, that a customized fruit and vegetable picking device having a low versatility and a high cost.

It should be understood that, although each step in the flowchart of FIG. 1 is displayed in accordance with an order indicated by a plurality of arrows, the steps do not have to be performed in the order indicated by the arrows. Unless it is explicitly stated in the description, executing the steps is not strictly limited into one order, while the steps may also be performed in a plurality of other orders. Moreover, at least a part of the steps in FIG. 1 may comprise a plurality of sub-steps or stages, while the sub-steps or stages are not necessarily executed and finished at a same time, instead they may be executed at a plurality of different moments, while an order of executing the sub-steps or the stages is not necessarily in a sequence, instead, they may be performed in a turn or alternately with other steps or at least a part of the sub-steps or stages of the other steps.

A person skilled in the art can understand that, all or part of the processes in the methods of the embodiments described above may be implemented by using a computer program to instruct a plurality of related hardware. The computer program may be stored in a non-volatile computer-readable storage medium, and when the computer program is executed, it may comprise the processes of the methods in the embodiments described above. Wherein, any references to a memory, a storage, a database or a plurality of other media used in the embodiments provided by the present disclosure, may comprise a non-volatile and/or a volatile memory. The non-volatile memory may comprise a read-only memory (ROM), a programmable ROM (PROM), an electrically programmable ROM (EPROM), an electrically erasable programmable ROM (EEPROM), or a flash memory. The volatile memory may comprise a random access memory (RAM) or an external high speed cache memory. By a way of illustration instead of limitation, the RAM is available in many forms, including a static RAM (SRAM), a dynamic RAM (DRAM), a synchronous DRAM (SDRAM), a dual data rate SDRAM (DDRSDRAM), an enhanced SDRAM (ESDRAM), a SynchLink DRAM (SLDRAM), a Rambus Direct RAM (RDRAM), a direct Rambus DRAM (DRDRAM), a Rambus Dynamic RAM (RDRAM) and more.

Figure 5:
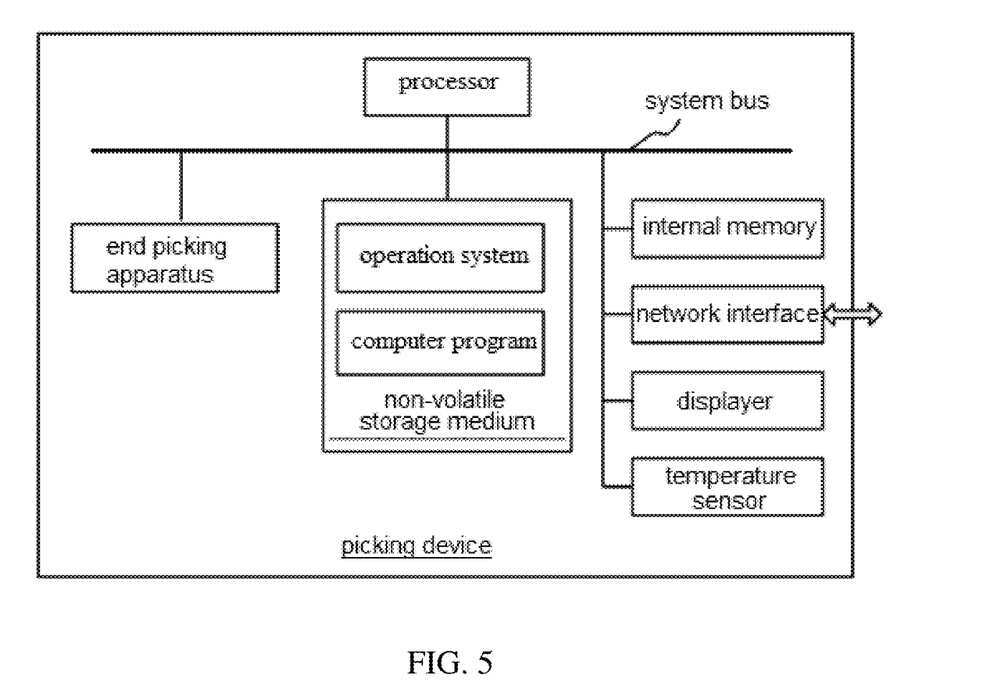
FIG. 5 illustrates a functional schematic diagram of a picking device.

Based on the embodiments described above, the present disclosure further provides a picking device, and a schematic block diagram thereof may be shown in FIG. 5. The picking device comprises a processor, a memory, a network interface, a displayer, a temperature sensor, and an end picking apparatus, connected through a system bus. Wherein the processor of the picking device is applied to providing a capability of both calculation and control. The memory of the picking device comprises a non-volatile storage medium and an internal memory. The non-volatile storage medium has an operation system and a plurality of computer programs stored. The internal memory provides an environment for running the operation system and the computer programs stored in the non-volatile storage medium. A network interface of the picking device is applied to communicating with a plurality of external terminals through a network connection. The computer program is executed by the processor to implement a fruit and vegetable picking method based on machine vision. The displayer of the picking device may be a liquid crystal display (LCD) or an electronic ink display. The temperature sensor of the picking device is set in advance in a smart terminal, applied to detecting a current operating temperature of a plurality of internal equipment. The end picking apparatus of the picking device is applied to receiving instructions before completing a picking action.

Those skilled in the art may understand that the schematic block diagram shown in FIG. 5 is only a block diagram of a part of structures related to the solution of the present disclosure, and does not constitute a limitation on the picking device to which the solution of the present disclosure is applied. A specific picking device may comprise more or less components than that shown in the figure, or may have some components combined together, or may have a different component arrangement.

In an embodiment, there is a picking device provided, comprising a memory and a processor. The memory has a plurality of computer programs stored, and when the processor runs the computer programs, at least a plurality of following steps may be implemented:

acquiring a fruit image of a fruit or a vegetable current to be picked, calling a pre-trained neural network model to identify the fruit image, and determining a type of the fruit or the vegetable to be picked;

acquiring the type of the fruit or the vegetable to be picked, and determining a cuttable area on a fruit stalk of the fruit or the vegetable to be picked, according to the type of the fruit or the vegetable, before locating a cutting point;

controlling the end picking apparatus to cut off the stalk of the fruit or the vegetable to be picked, according to the cutting point determined.

In an embodiment, when the processor executes the computer programs, it may further implement: pre-collecting a data set of different types of fruits and vegetables, using the deep learning frameworks including Tensorflow™ and Keras™ to build the Mask r-cnn network model; performing a model learning and training on the data set through a supervised learning method, using the model trained to extract a plurality of features from the data sets of different types of fruits or the vegetables, before constructing a neural network model for automatically identifying the pulp of the fruit or the vegetable. Preferably, the data set comprises a plurality of fruit images of different types of fruits and vegetables.

In an embodiment, when the processor executes the computer programs, it may further implement: using a camera apparatus preset on the picking device to obtain a plurality of fruit images of the fruit or the vegetable to be picked, and preprocessing the fruit images; extracting a plurality of features from the fruit images preprocessed, and calling a neural network model to identify the features extracted; before the type of the fruit or the vegetable to be picked is determined according to a recognition result.

In an embodiment, when the processor executes the computer programs, it may further implement: performing a noise reduction, a light supplement, and a white balance processing onto the fruit images, to improve a quality of the fruit images.

In an embodiment, when the processor executes the computer programs, it may further implement: calling a Mask r-cnn backbone network to extract a feature map of the fruit images pre-processed, and using a regional recommendation network to generate a region proposal for a target; selecting a region of interest in the region proposal, before detecting the region of interest and outputting a recognition result.

In an embodiment, when the processor executes the computer programs, it may further implement: acquiring the identified type of the fruit or the vegetable to be picked, predicting and frame selecting the stalks in the fruit images according to the type of the fruit or the vegetable to determine a plurality of stalk areas; according to the stalk areas determined, a cuttable area on the stalk is determined, and a best cutting point is located.

In an embodiment, when the processor executes the computer programs, it may further implement: controlling the end picking apparatus to clamp the stalks of the fruit or the vegetable to be picked according to the cutting point determined; and cutting the stalks off after clamping the stalks, as well as controlling the end picking apparatus to restore an initial state, after the fruit stalk is cut.

Based on the embodiments described above, the present disclosure further provides a computer-readable storage medium, wherein the computer-readable storage medium has one or more programs stored, and the one or more programs may be executed by one or more processors, so as to realize the steps according to any one of the fruit and vegetable picking method based on machine vision described above, and details have been described above.

All above, the present disclosure provides a fruit and vegetable picking method and a device based on machine vision, as well as a storage medium, by using a pre-trained neural network model to detect the fruit and cut the fruit stalk thereof for picking, it may achieve using one device to pick multiple fruits and vegetables, which has a high versatility and a high picking accuracy, without hurting the pulp, while a harvest efficiency and a quality of the fruits and vegetables picked have been improved.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

The invention claimed is:

1. A fruit and vegetable picking method based on machine vision, comprising:
    collecting a data set of different types of fruits and vegetables and building a Mask r-cnn network model by using a deep learning framework on the dataset, the data set of different types of fruits and vegetables comprises a plurality of pulp images or plant images of different varieties of fruits and vegetables, a plurality of pulp images in different maturity levels of the fruits and vegetables, a plurality of environment images of a garden or a vegetable greenhouse, and a plurality of images of various fruits and vegetables in a to-be-picked state in the gardens or the vegetable greenhouses;
    acquiring a fruit image of a fruit or a vegetable to be picked, calling the Mask r-cnn network model to identify the fruit image from the dataset, and determining a type of the fruit or the vegetable to be picked;
    acquiring the type of the fruit or the vegetable to be picked, and determining a cuttable area on a fruit stalk of the fruit or the vegetable to be picked according to the type of the fruit or the vegetable, before locating a cutting point; and
    controlling an end picking apparatus to cut off the stalk of the fruit or the vegetable to be picked, according to the cutting point determined.

2. The fruit and vegetable picking method based on machine vision according to claim 1, further comprising, after the step of collecting a data set of different types of fruits and vegetables, and building a Mask r-cnn network model by using a deep learning framework, and before the step of acquiring a fruit image of a fruit or a vegetable to be picked, calling a pre-trained neural network model to identify the fruit image, and determining a type of the fruit or the vegetable to be picked:
    performing a model learning and training on the data set by using a supervised learning method, performing a feature extraction on the data set of different types of fruits and vegetables by using the model trained, and constructing a neural network model for automatically identifying the pulp of a fruit or a vegetable.

3. The fruit and vegetable picking method based on machine vision according to claim 1, wherein the step of acquiring a fruit image of a fruit or a vegetable to be picked, calling a pre-trained neural network model to identify the fruit image, and determining a type of the fruit or the vegetable to be picked further comprises:
    using a camera apparatus preset on the picking device to obtain a plurality of fruit images of the fruit or the vegetable to be picked, and preprocessing the fruit images;
    extracting a plurality of features from the fruit images preprocessed, and calling the neural network model to identify the features extracted; and
    determining the type of the fruit or the vegetable to be picked, according to a recognition result.

4. The fruit and vegetable picking method based on machine vision according to claim 3, wherein the step of preprocessing the fruit images further comprises: performing a noise reduction, a light supplement, and a white balance processing on the fruit images, to improve a quality of the fruit images.

5. The fruit and vegetable picking method based on machine vision according to claim 3, wherein the step of extracting a plurality of features from the fruit images preprocessed, and calling a neural network model to identify the features extracted further comprises:
    calling a Mask r-cnn backbone network to extract a feature map of the fruit images pre-processed, and using a regional recommendation network to generate a region proposal for a target; and
    selecting a region of interest in the region proposal, before detecting the region of interest and outputting a recognition result.

6. The fruit and vegetable picking method based on machine vision according to claim 1, wherein the step of acquiring the type of the fruit or the vegetable to be picked, and determining a cuttable area on a fruit stalk of the fruit or the vegetable to be picked according to the type of the fruit or the vegetable, before locating a cutting point further comprises:
    acquiring the detected type of the fruit or the vegetable to be picked, predicting and selecting the stalks in the fruit images according to the type of the fruit or the vegetable to select a plurality of stalk areas; and according to the stalk area selected, a cuttable area on the stalk is determined, and a best cutting point is located.

7. The fruit and vegetable picking method based on machine vision according to claim 1, wherein the step of controlling an end picking apparatus to cut off the fruit stalk of the fruit or the vegetable to be picked, according to the cutting point selected further comprises:
controlling the end picking apparatus to clamp the stalk of the fruit or the vegetable to be picked, according to the cutting point determined; and
cutting the stalk off after clamping the stalk, and controlling the end picking apparatus to restore an initial state after the stalk is cut.

8. A picking device, comprising: a processor and a storage medium communicating with the processor, the storage medium stores a plurality of instructions; the processor follows the instructions stored in the storage medium to implement a plurality of steps of a fruit and vegetable picking method based on machine vision, the steps of the fruit and vegetable picking method based on machine vision comprising:
collecting a data set of different types of fruits and vegetables, and building a Mask r-cnn network model by using a deep learning framework on the dataset, wherein the data set of different types of fruits and vegetables comprises a plurality of pulp images or plant images of different varieties of fruits and vegetables, a plurality of pulp images in different maturity levels of the fruits and vegetables, a plurality of environment images of a garden or a vegetable greenhouse, and a plurality of images of various fruits and vegetables in a to-be-picked state in the gardens or the vegetable greenhouses;
acquiring a fruit image of a fruit or a vegetable current to be picked, calling the Mask r-cnn network model to identify the fruit image from the dataset, and determining a type of the fruit or the vegetable to be picked;
acquiring the type of the fruit or the vegetable to be picked, and determining a cuttable area on a fruit stalk of the fruit or the vegetable to be picked, according to the type of the fruit or the vegetable, before locating a cutting point; and
controlling an end picking apparatus to cut off the stalk of the fruit or the vegetable to be picked, according to the cutting point determined.

9. A storage medium, having a plurality of instructions stored, wherein the instructions are able to be loaded and executed by a processor, to implement a plurality of steps of a fruit and vegetable picking method based on machine vision, the steps of the fruit and vegetable picking method based on machine vision comprising:
collecting a data set of different types of fruits and vegetables, and building a Mask r-cnn network model by using a deep learning framework on the dataset;
wherein the data set of different types of fruits and vegetables comprises a plurality of pulp images or plant images of different varieties of fruits and vegetables, a plurality of pulp images in different maturity levels of the fruits and vegetables, a plurality of environment images of a garden or a vegetable greenhouse, and a plurality of images of various fruits and vegetables in a to-be-picked state in the gardens or the vegetable greenhouses;
acquiring a fruit image of a fruit or a vegetable current to be picked, calling the Mask r-cnn network model to identify the fruit image from the dataset, and determining a type of the fruit or the vegetable to be picked;
acquiring the type of the fruit or the vegetable to be picked, and determining a cuttable area on a fruit stalk of the fruit or the vegetable to be picked, according to the type of the fruit or the vegetable, before locating a cutting point; and
controlling an end picking apparatus to cut off the stalk of the fruit or the vegetable to be picked, according to the cutting point determined.

* * * * *